United States Patent
Farrell et al.

(10) Patent No.: US 10,456,987 B2
(45) Date of Patent: Oct. 29, 2019

(54) LASER WELDABLE COMPOSITIONS, ARTICLES FORMED THEREFROM, AND METHODS OF MANUFACTURE

(71) Applicant: SABIC GLOBAL TECHNOLOGIES B.V., Bergen Op Zoom (NL)

(72) Inventors: Tony Farrell, Bergen Op Zoom (NL); Paul Dean Sybert, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/096,010

(22) PCT Filed: Apr. 28, 2017

(86) PCT No.: PCT/IB2017/052507
§ 371 (c)(1),
(2) Date: Oct. 24, 2018

(87) PCT Pub. No.: WO2017/187428
PCT Pub. Date: Nov. 2, 2017

(65) Prior Publication Data
US 2019/0134919 A1 May 9, 2019

Related U.S. Application Data

(60) Provisional application No. 62/328,887, filed on Apr. 28, 2016.

(51) Int. Cl.
| | |
|---|---|
| B29C 65/16 | (2006.01) |
| C08L 67/02 | (2006.01) |
| G02B 1/04 | (2006.01) |
| B29C 65/00 | (2006.01) |
| C08K 7/14 | (2006.01) |
| C08L 69/00 | (2006.01) |
| B29K 105/00 | (2006.01) |

(52) U.S. Cl.
CPC ...... B29C 65/1616 (2013.01); B29C 65/1635 (2013.01); B29C 65/1677 (2013.01); B29C 66/712 (2013.01); C08K 7/14 (2013.01); C08L 67/02 (2013.01); C08L 69/005 (2013.01); G02B 1/04 (2013.01); B29C 66/73321 (2013.01); B29K 2105/0085 (2013.01)

(58) Field of Classification Search
CPC .......... B29C 65/1616; B29C 65/1635; B29C 65/1677; B29C 66/712; C08K 7/14; C08L 69/005; C08L 67/02; G02B 1/04
USPC .......................................... 156/272.2, 272.8
See application file for complete search history.

(56) References Cited

U.S. PATENT DOCUMENTS

| | | | |
|---|---|---|---|
| 3,030,331 A | 4/1962 | Goldberg | |
| 4,189,549 A | 2/1980 | Matsunaga et al. | |
| 5,885,497 A | 3/1999 | Maas et al. | |
| 7,189,796 B2 | 3/2007 | Mitsunaga et al. | |
| 7,495,065 B2 | 2/2009 | Kim et al. | |
| 7,495,066 B2 | 2/2009 | Balakrishnan et al. | |
| 8,318,891 B2 | 11/2012 | Balakrishnan et al. | |
| 8,487,065 B2 | 7/2013 | Mahood et al. | |
| 2007/0123687 A1* | 5/2007 | Balakrishnan | C08G 63/64 528/196 |
| 2008/0161507 A1 | 7/2008 | Chakravarti et al. | |
| 2009/0130451 A1* | 5/2009 | Farrell | B29C 65/1616 428/411.1 |
| 2010/0130700 A1 | 5/2010 | De Brouwer et al. | |
| 2010/0267889 A1 | 10/2010 | Seidel et al. | |
| 2010/0286358 A1 | 11/2010 | Mahood et al. | |
| 2011/0071261 A1 | 3/2011 | Hoeks et al. | |
| 2011/0152470 A1 | 6/2011 | Meyer et al. | |
| 2011/0256406 A1 | 10/2011 | Farrell et al. | |
| 2011/0288220 A1 | 11/2011 | Benten et al. | |
| 2011/0306707 A1 | 12/2011 | Benten et al. | |
| 2012/0183778 A1* | 7/2012 | Farrell | C08L 67/02 428/412 |
| 2014/0179855 A1 | 6/2014 | Farrell et al. | |
| 2014/0295363 A1 | 10/2014 | Sun et al. | |
| 2015/0240074 A1 | 8/2015 | Chen et al. | |

FOREIGN PATENT DOCUMENTS

| | | |
|---|---|---|
| DE | 10330722 A1 | 2/2005 |
| WO | 2013049967 A1 | 10/2011 |
| WO | 2013175448 A1 | 5/2013 |
| WO | 2014039645 A1 | 3/2014 |
| WO | 2014072923 A1 | 5/2014 |

(Continued)

OTHER PUBLICATIONS

Min; "Synthesis and Characterization of Some Polyestercarbonates"; Polymer Journal, vol. 33, No. 9; 2001, pp. 694-700.

(Continued)

*Primary Examiner* — Daniel McNally
(74) *Attorney, Agent, or Firm* — Cantor Colburn LLP

(57) ABSTRACT

A laser weldable composition comprising a polyester component, 5 to 50 weight percent of a filler; and 10 to 30 wt. % of a poly(ester-carbonate) copolymer comprising carbonate units and ester units of the formula (I) wherein: T is a $C_{2-20}$ alkylene, a $C_{6-20}$ cycloalkylene, or a $C_{6-20}$ arylene; $R^1$ and J are each independently (a) a bisphenol A divalent group, and (b) a $C_{16}$ or higher divalent group (b1), (b2), or (b1) and (b2), wherein (b1) is a phthalimidine divalent group, and (b2) is a third divalent group, wherein the $C_{16}$ or higher divalent group (b1), (b2) or a combination of (b1) and (b2) is present in an amount of 40 mol % to 50 mol % based on the total moles of the bisphenol A divalent groups and the $C_{16}$ or higher divalent group; and the composition, when molded into an article having a 2.0 mm thickness, provides a near infrared transmission at 960 nanometers of greater than 50% and a thermal resistance according to HDT 1.8 MPa flat (ISO 75/Af) is greater than 160° C.

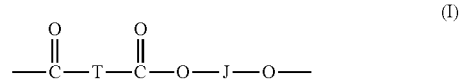

(I)

20 Claims, No Drawings

(56) References Cited

FOREIGN PATENT DOCUMENTS

| WO | 2014097196 A1 | 6/2014 |
|---|---|---|
| WO | 2015111003 A1 | 7/2015 |
| WO | 2017187424 A1 | 11/2017 |
| WO | 2017187427 A1 | 11/2017 |
| WO | 2017187430 A1 | 11/2017 |

OTHER PUBLICATIONS

International Search Report for International Application No. PCT/IB2017/052501, International Filing Date Apr. 28, 2017, dated Jul. 14, 2017, 5 pages.

International Search Report for International Application No. PCT/IB2017/052506, International Filing Date Apr. 28, 2017, dated Jul. 6, 2017, 5 pages.

International Search Report for International Application No. PCT/IB2017/052507, International Filing Date Apr. 28, 2017, dated Aug. 3, 2017, 6 pages.

International Search Report for International Application No. PCT/IB2017/052510, International Filing Date Apr. 28, 2017, dated Jul. 6, 2017, 5 pages.

Written Opinion for International Application No. PCT/IB2017/052501, International Filing Date Apr. 28, 2017, dated Jul. 14, 2017, 5 pages.

Written Opinion for International Application No. PCT/IB2017/052506, International Filing Date Apr. 28, 2017, dated Jul. 6, 2017, 6 pages.

Written Opinion for International Application No. PCT/IB2017/052507, International Filing Date Apr. 28, 2017, dated Aug. 3, 2017, 6 pages.

Written Opinion for International Application No. PCT/IB2017/052510, International Filing Date Apr. 28, 2017, dated Jul. 6, 2017, 5 pages.

\* cited by examiner

LASER WELDABLE COMPOSITIONS, ARTICLES FORMED THEREFROM, AND METHODS OF MANUFACTURE

CROSS REFERENCE TO RELATED APPLICATIONS

This application is a National Stage application of PCT/IB2017/052507, filed Apr. 28, 2017, which claims the benefit of U.S. Provisional Application No. 62/328,887, filed Apr. 28, 2016, both of which are incorporated by reference in their entirety herein.

BACKGROUND

This disclosure is directed to thermoplastic compositions, articles formed therefrom, and their methods of manufacture, and in particular laser weldable compositions comprising polyesters, methods of manufacture, and articles thereof.

Polymer articles having high thermal resistance, for example from 100 to 150° C., or higher, are desirable in a wide variety of applications, for example electronic devices, and parts for automobiles and other transports, such as ships and jets. There is a particular need for components parts for "under-the hood" applications in transports, for example sensor housings.

Component parts can be assembled into larger ones by processes such as gluing, ultrasonic welding, hot-plate welding, and vibration welding. Recently, the use of lasers to join component parts has become more widespread. In laser welding of two polymer parts by transmission welding, one of the polymer parts is substantially transparent to laser light to allow transmission to the welding interface, and the other polymer part absorbs sufficient laser light to generate heat for welding at the interface of the parts. External pressure can be applied to provide uninterrupted contact between the surfaces of the parts, and heat conduction between the parts results in the melting of the polymers in both the absorbing and the transmitting parts, to provide a weld at the interface. When laser light of near-infrared (NIR) wavelength is used for welding, the level of NIR transmission through the transparent part should allow sufficient laser-light density to arrive at the interface to facilitate effective and rapid welding. Otherwise, joining of the two parts by laser welding would be impractical or limited to slow scan speeds. It is desired that the cycle time for assembly of parts be as short as possible.

Poly(butylene terephthalate) (PBT) and PBT reinforced with glass fibers or mineral fillers can be used in numerous applications, especially in the automotive and electrical industry, owing to their excellent electrical resistance, surface finish, and toughness. A potential problem with welding materials based on crystalline or partially crystalline materials, such as PBT, however, is that such polymers can also partially disperse or scatter incoming radiation. Consequently, the extent of the laser energy arriving at the joining interface can be diminished, thereby reducing the adhesion between the parts to be welded. In particular, a reduction in weld strength for a given amount of laser energy applied to the article to be welded can result in a substantial increase in laser welding assembly cycle time.

Additionally, scattering effects are greatly enhanced when fillers such as glass fibers are present, especially when the laser transparent part thickness is greater than 1 millimeter. Therefore, the laser-welding of crystalline polymers, particularly glass-filled crystalline polymers, is restricted, if not impracticable in many cases.

Another drawback of laser welding is that internal scattering of the laser light in the laser-transparent polymer part can cause a temperature increase, especially in thick-walled parts, and can result in sink marks or burning along the weld line in the laser-transparent part. It is therefore beneficial to have high and consistent laser transparency across a range of thicknesses and processing conditions of the part to achieve consistent weld strengths.

One approach to increase laser transparency is to speed the rate of crystallization of the polymer using a chemical nucleant. This can occur by chemical reaction between the nucleating agent and polymeric end groups of PBT to produce ionic end groups that enhance the rate of crystallization. The addition of such chemical nucleants, however, can lower the molecular weight of the crystalline material and lead to unstable melt viscosity. Additionally, such chemical nucleants can substantially degrade many of the amorphous materials used in PBT blends, causing unstable melt viscosities and other undesirable defects such as splay and jetting (deformations due to turbulent flow).

It is therefore desired to achieve improved NIR transmission for laser-weldable thermoplastic compositions that provide heat resistance, especially compositions comprising glass fibers or other fillers.

SUMMARY

A laser weldable composition comprising
a polyester component comprising a poly(butylene terephthalate) homopolymer, a poly(ethylene terephthalate) homopolymer, a poly(cyclohexylenedimethylene terephthalate) homopolymer, a poly(butylene terephthalate) copolymer, a poly(ethylene terephthalate) copolymer, a poly(cyclohexylenedimethylene terephthalate) copolymer, or a combination comprising at least one of the foregoing;
5 to 50 weight percent of a filler; and
10 to 30 wt. %, preferably 15 to 25% of a poly(estercarbonate) copolymer comprising
carbonate units of the formula

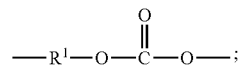

and
ester units of the formula

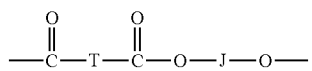

wherein: T is a $C_{2-20}$ alkylene, a $C_{6-20}$ cycloalkylene, or a $C_{6-20}$ arylene; and $R^1$ and J are each independently
(a) a bisphenol A divalent group of the formula

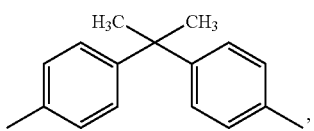

and
(b) a $C_{16}$ or higher divalent group (b1), (b2), or (b1) and (b2), wherein (b1) is a phthalimidine divalent group of the formula

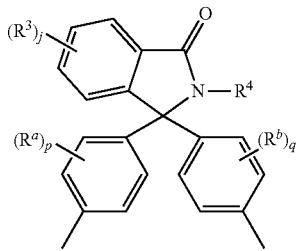

wherein $R^a$ and $R^b$ are each independently a $C_{1-12}$ alkyl, $C_{2-12}$ alkenyl, $C_{3-8}$ cycloalkyl, or $C_{1-12}$ alkoxy, each $R^3$ is independently a $C_{1-6}$ alkyl, $R^4$ is hydrogen, $C_{1-6}$ alkyl, or phenyl optionally substituted with 1 to 5 $C_{1-6}$ alkyl groups, preferably wherein $R^4$ is hydrogen, methyl, or phenyl, more preferably phenyl, p, q, and j are each independently 0 to 4, preferably 0, and (b2) is a third divalent group of the formula

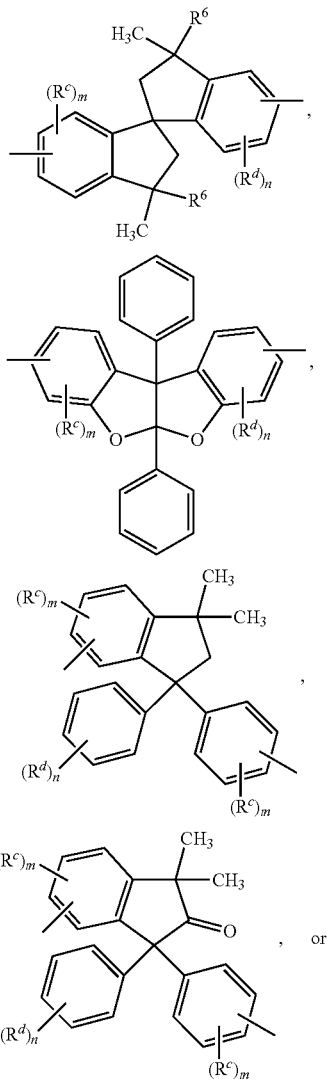

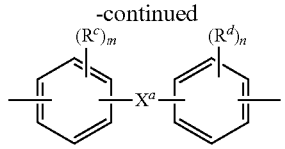

wherein
$R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, y is 1, and m and n are each independently 0 to 4; the $C_{16}$ or higher divalent group (b1), (b2) or a combination of (b1) and (b2) is present in an amount of 40 mol % to 50 mol % based on the total moles of the bisphenol A divalent groups and the $C_{16}$ or higher divalent group; and the composition, when molded into an article having a 2.0 mm thickness, provides a near infrared transmission at 960 nanometers of greater than 50% and a thermal resistance according to HDT 1.8 MPa flat (ISO 75/Af) of greater than 160° C., preferably greater than 165° C. and more preferably greater than 170° C.

A process for welding a laser-transmissive first part to a laser-absorbing second part of an article is disclosed. The process comprises: contacting a first part comprising the laser weldable composition as disclosed herein with a second part comprising a thermoplastic composition comprising an NIR-absorbing agent, where at least a portion of a surface of the first part is placed in physical contact with at least a portion of a surface of the second part to form a welding join area, and applying NIR-laser radiation to the first part such that the radiation substantially passes through the first part and is absorbed by the second part so that sufficient heat is generated to effectively weld the first part to the second part of the article.

A laser welded, molded article comprising a first laser-transmissive part welded to a second laser-absorbing part, wherein the first part comprises a product made by a process comprising melting-blending a laser weldable composition.

The above described and other features are exemplified by the following drawings, detailed description, examples, and claims.

DETAILED DESCRIPTION

Surprisingly, it has been found that the combination of crystalline or partially crystalline (semi-crystalline) polymers with a high heat poly(ester-carbonate) as disclosed herein significantly improves the near infra-red transparency (wavelengths of 800 to 1,500 nm) of the polymer composition, while at the same time providing a composition having high thermal resistance. These results are surprising because it has been found that the addition of a polycarbonate homopolymer to PBT increases the NIR transmission, but dramatically lowers the thermal resistance of the composition; and using a high heat polycarbonate such as a copolycarbonate comprising bisphenol A carbonate units and 2-phenyl-3,3'-bis(4-hydroxyphenyl) phthalimidine carbonate units (PPPBP-BPA) or a high heat poly(phthalate-carbonate) (PPC) does not furnish both the desired high NIR transmission and high thermal resistance.

Accordingly, the polyester/poly(ester-carbonate) compositions described herein can unexpectedly facilitate the laser welding of articles at desirable weld speeds. Moreover, the compositions can achieve high weld strength of welded articles without significantly sacrificing or impairing thermal resistance of the articles. Furthermore, the weldable composition can contain substantial amounts of glass fiber or other filler. In particular, the disclosed compositions can exhibit high NIR transparency as measured at a near infrared transmission of 960 nanometers, and good thermal resistance properties. A NIR laser-light transmission of greater than 50 percent and more specifically greater than 55 percent and a Vicat softening temperature of at least 190° C. can be obtained. A heat deflection temperature of greater than 200° C. is obtainable, determined at 0.45 MPa on a 4 mm thick sample according to ISO 75Af.

The laser weldable compositions comprise from 20 to 70 weight percent (wt. %), preferably 30 to 60 wt. %, or 40 to 60 wt. %, or more preferably 45 to 55 wt. %, of a polyester component. The polyester component comprises a poly (butylene terephthalate) homopolymer, a poly(ethylene terephthalate) homopolymer, a poly(butylene terephthalate) copolymer, a poly(ethylene terephthalate) copolymer, or a combination comprising at least one of the foregoing. In an embodiment, the polyester component is a partially crystalline or crystalline component. As used herein, a "crystalline" polymer contains only crystalline domains and a "partially crystalline" polymer characteristically comprises one or more crystalline domains and one or more amorphous domains.

The poly(butylene terephthalate) homopolymers, poly (ethylene terephthalate) homopolymers, poly(cyclohexylenedimethylene terephthalate) homopolymers, poly(butylene terephthalate) copolymers, poly(ethylene terephthalate) copolymers, and poly(cyclohexylenedimethylene terephthalate) copolymers comprise repeating units of formula (1):

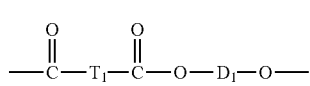
(1)

wherein $T^1$ is a residue derived from a diacid such as terephthalic acid, isophthalic acid, or a chemical equivalent thereof, and $D^1$ is a residue derived from a diol such as ethylene glycol or a butylene diol, specifically 1,4-butane diol, or chemical equivalent thereof. Chemical equivalents of diacids include dialkyl esters, e.g., dimethyl esters, diaryl esters, anhydrides, salts, acid chlorides, acid bromides, and the like. Chemical equivalents of diols include esters, for example, dialkylesters. In a specific embodiment, $T^1$ is derived from a combination of terephthalic acid and isophthalic acid (or a reactive derivative thereof) wherein the weight ratio of terephthalic acid to isophthalic acid is 99:1 to 10:90, specifically 55:1 to 50:50; and $D^1$ is derived from ethylene glycol or 1,4-butane diol or cyclohexanedimethanol, preferably 1,4-butane diol (or a chemical equivalent thereof).

Other $T^1$ or $D^1$ units can be present in the polyester, provided that the type or amount of such units does not significantly adversely affect the desired properties of the laser weldable compositions. Preferably, the alternative $T^1$ or $D^1$ units can be present in an amount of 30 mole percent (mol %) or less, preferably 20 mol % or less, more preferably 10 mol % or less, most preferably 5 mol % or less. In an embodiment, no alternative $T^1$ or $D^1$ units are present.

Examples of alternative aromatic dicarboxylic acids that can be used include 1,4-naphthalenedicarboxylic acid, 1,5-naphthalenedicarboxylic acid, 2,6-naphthalenedicarboxylic acid, and combinations comprising at least one of the foregoing dicarboxylic acids. Exemplary cycloaliphatic dicarboxylic acids include norbornene dicarboxylic acids, 1,4-cyclohexanedicarboxylic acids, and the like, and combinations comprising at least one of the foregoing dicarboxylic acids.

Examples of alternative diols that can be used include $C_{6-12}$ aromatic diols, for example resorcinol, hydroquinone, or pyrocatechol, as well as diols such as 1,5-naphthalene diol, 2,6-naphthalene diol, 1,4-naphthalene diol, 4,4'-dihydroxybiphenyl, bis(4-hydroxyphenyl) ether, bis(4-hydroxyphenyl) sulfone, and the like, and combinations comprising at least one of the foregoing aromatic diols. Exemplary alternative $C_{2-12}$ aliphatic diols that can be used include straight chain, branched, or cycloaliphatic alkane diols such as propylene glycol, i.e., 1, 2- and 1,3-propylene glycol, 2,2-dimethyl-1,3-propane diol, 2-ethyl-2-methyl-1,3-propane diol, 2,2,4,4-tetramethyl-cyclobutane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol, and the like, and combinations comprising at least of the foregoing diols.

The polyester component can have an intrinsic viscosity, as determined in phenol tetrachlorethane at 25° C., of 0.3 to 2 deciliters per gram, preferably 0.45 to 1.2 deciliters per gram. The polyester component can have a weight average molecular weight of 10,000 to 200,000 Daltons, preferably 20,000 to 150,000 Daltons as measured by gel permeation chromatography with polystyrene standards.

The poly(ester-carbonate)s, also known as polyester-polycarbonates, comprise carbonate units of formula (2)

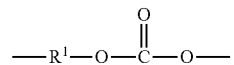
(2)

and ester units of formula (3)

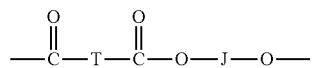
(3)

wherein the variables T, $R^1$ and J are further described below.

In formula (3), T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Preferably, T is a $C_{6-20}$ divalent aromatic group such as a divalent isophthaloyl group, a divalent terephthaloyl group, or a combination thereof. Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. Aliphatic dicarboxylic acid that can be used to prepare the polyester units include a linear $C_{6-20}$ aliphatic dicarboxylic acid (which includes a reactive derivative thereof), preferably a linear $C_6$-$C_{12}$ aliphatic dicarboxylic acid (which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA).

Further in formulas (2) and (3), $R^1$ and J are each independently (a) a bisphenol A divalent group and (b) a C16 or higher divalent group derived from a specific high heat monomer as further described below.

As is known in the art, the bisphenol A divalent group is of formula (4)

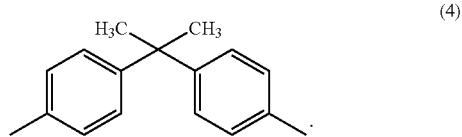

(4)

All or a portion of the $R^1$ groups can be the bisphenol A divalent groups (a), provided that at least a portion of the J groups are the C16 or higher divalent group; or all portion of the J groups can be the bisphenol A divalent groups, provided that at least a portion of the $R^1$ groups are the C16 or higher divalent group.

The C16 or higher divalent group (b) is (b1) a phthalimidine divalent group, or (b2) a third divalent group different from the phthalimidine divalent group, or (b3) both, i.e, a combination of both (b1) the phthalimidine divalent group and (b2) the third divalent group different from the phthalimidine divalent group.

The phthalimidine divalent group (b1) is of formula (5)

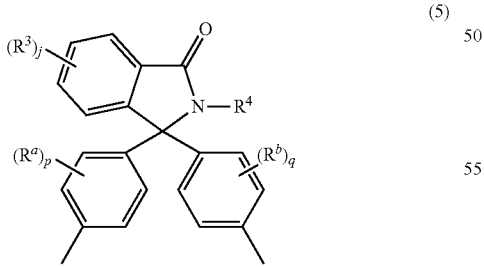

(5)

wherein $R^a$ and $R^b$ are each independently a $C_{1-12}$ alkyl, $C_{2-12}$ alkenyl, $C_{3-8}$ cycloalkyl, or $C_{1-12}$ alkoxy, preferably a $C_{1-3}$ alkyl, each $R^3$ is independently a $C_{1-6}$ alkyl, $R^4$ is hydrogen, $C_{1-6}$ or $C_{2-6}$ alkyl or phenyl optionally substituted with 1 to 5 $C_{1-6}$ alkyl groups, and p, q, and j are each independently 0 to 4, preferably 0 to 1. For example, the phthalimidine divalent group can be of formula (5a)

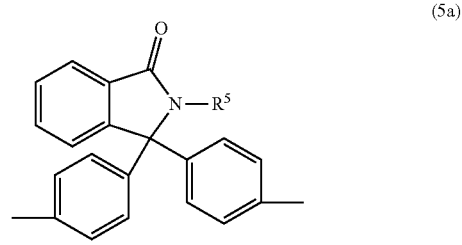

(5a)

wherein $R^5$ is hydrogen, phenyl optionally substituted with up to five $C_{1-6}$ alkyl groups, or $C_{1-4}$ alkyl, preferably $C_{2-4}$ alkyl. In an embodiment, $R^5$ is hydrogen, methyl, or phenyl, most preferably phenyl. When $R^5$ is phenyl, $R^1$ and J can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol or "PPPBP"). A combination of different phthalimidine divalent groups can be used.

In an embodiment, at least one phthalimidine divalent group (b1) is present in the ester groups of the poly(estercarbonate) copolymer.

In other embodiments, the $C_{16}$ or higher divalent group (b) is (b2) a third divalent group of the formula (6), (7), (8), (16), or (17)

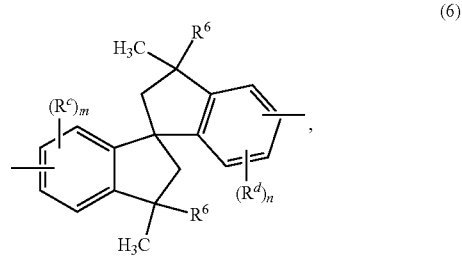

(6)

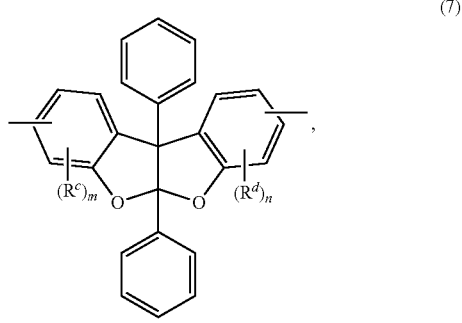

(7)

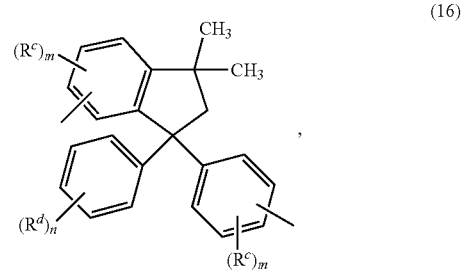

(16)

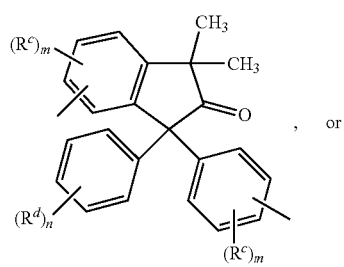

(17)

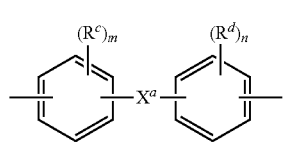

(8)

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, or a $-(Q^1)_x-G-(Q^2)_y-$ group, wherein $Q^1$ and $Q^2$ are each independently a $C_{1-3}$ alkylene, G is a $C_{3-10}$ cycloalkylene, x is 0 or 1, y is 1, and m and n are each independently 0 to 4. A combination of different third divalent groups can be used. In an embodiment, at least one third divalent group (b2) is present in the ester groups of the poly(ester-carbonate) copolymer.

Exemplary third divalent groups (8) include the following:

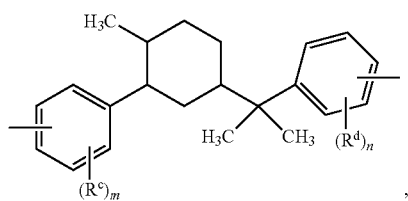

(8a)

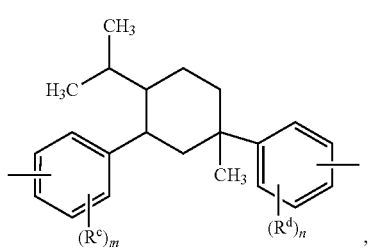

(8b)

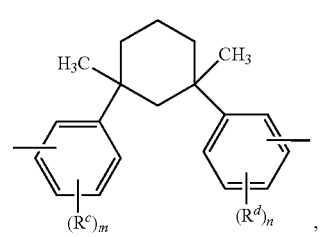

(8c)

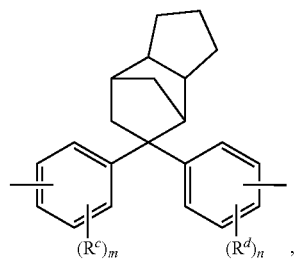

(8d)

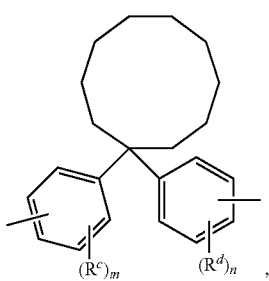

(8e)

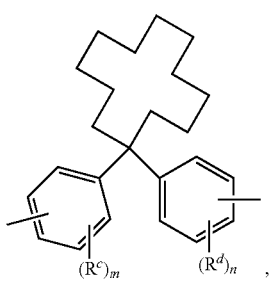

(8f)

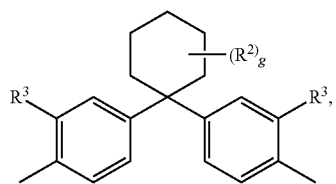

(8g)

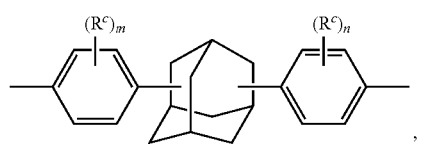

(8h)

, or

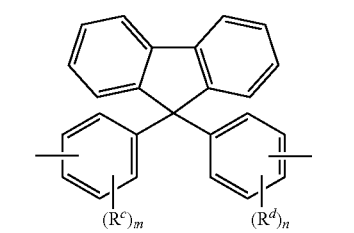

(8i)

wherein $R^c$ and $R^d$ are the same as defined herein for formulas (6)-(8), (16), (17), each $R^2$ is independently hydrogen or $C_{1-4}$ alkyl, m and n are each independently 0 to 4, each $R^3$ is independently $C_{1-4}$ alkyl or hydrogen, and g is 0 to 10. In a specific embodiment the third divalent group is derived from 1,1-bis(4-hydroxyphenyl)-3,3,5-trimethyl-cyclohexane, 1,1-bis(4-hydroxy-3-methylphenyl)cyclohexane, or a combination thereof. Preferably, the third divalent group is derived from 1,1-bis(4-hydroxyphenyl)-3,3,5-trimethylcyclohexane (BP-TMC).

The poly(ester-carbonate) copolymers can be manufactured by processes such as interfacial polymerization and melt polymerization, which are known, and are described, for example, in U.S. Pat. Nos. 3,030,331; 4,189,549; WO 2013/175448; and WO 2014/072923. Synthesis generally proceeds from the corresponding bisphenols, for example bisphenol A (9)

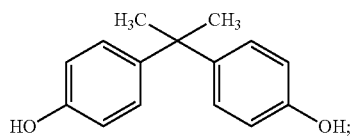

bisphenol phthalimidine (10)

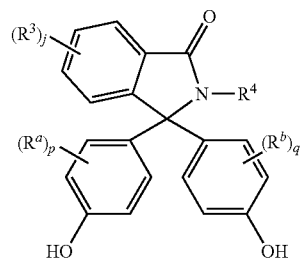

wherein $R^a$, $R^b$, $R^3$, $R^4$, j, p, and q are as defined herein for formula (5); or bisphenols of formula (11), (12), or (13)

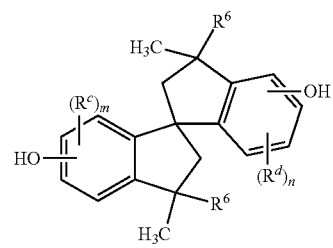

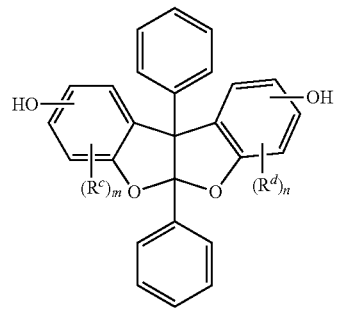

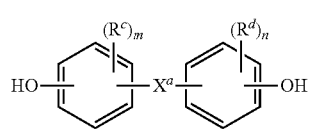

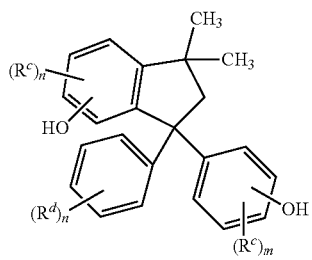

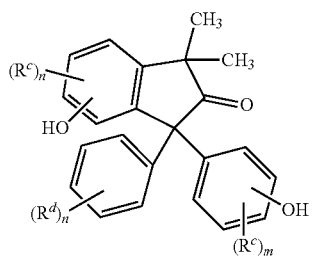

wherein $R^c$, $R^d$, $R^6$, x, y, m, and n are the same as defined herein for formulas (6)-(8), (16), and (17). Exemplary bisphenols of formula (13) include the following:

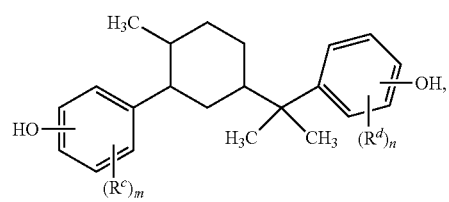

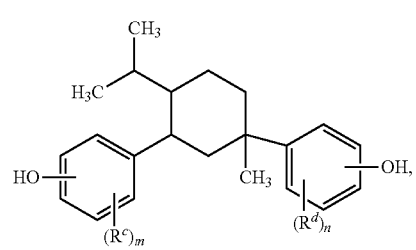

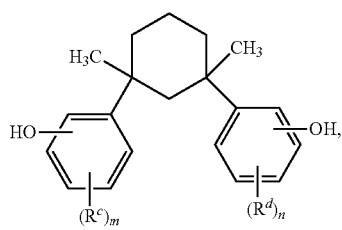

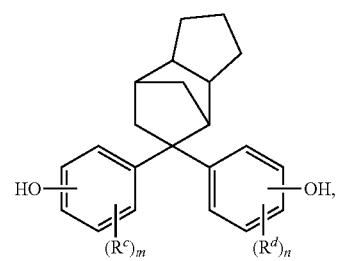

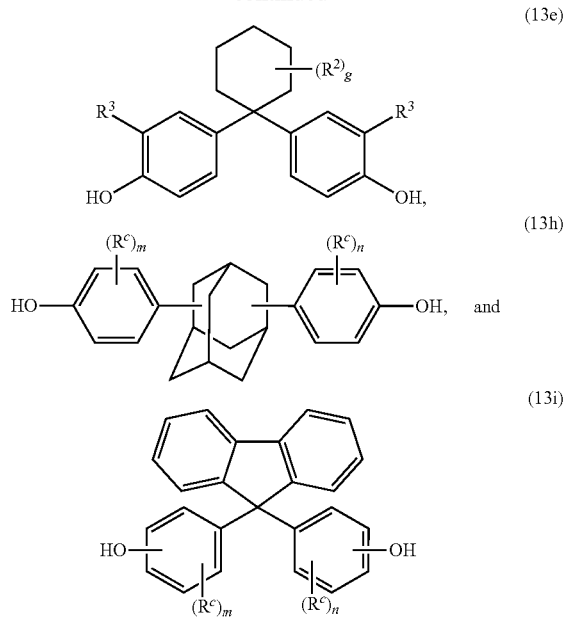

wherein $R^c$, $R^d$, $R^2$, g, m, and n are the same as defined herein for formulas (8a)-(8b). In a specific embodiment the bisphenol (13) is 1,1-bis(4-hydroxyphenyl)-3,3,5-trimethylcyclohexane, 1,1-bis(4-hydroxy-3-methylphenyl)cyclohexane, or a combination thereof.

Poly(ester-carbonate)s can be manufactured by processes such as interfacial polymerization and melt polymerization, which are known, and are described, for example, in U.S. Pat. No. 8,318,891, WO 2013/175448 A1 and WO 2014/072923 A1.

An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Combinations of different end groups can be used. Branched polymers can be prepared by adding a branching agent during polymerization, for example trimellitic acid, trimellitic anhydride, trimellitic trichloride, tris-p-hydroxyphenylethane, isatin-bisphenol, tris-phenol TC (1,3,5-tris((p-hydroxyphenyl) isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %.

The poly(ester-carbonate)s comprise 40 mol % to 70 mol % of the (a) bisphenol A divalent groups (4) and 30 mol % to 60 mol % of the (b) $C_{16}$ or higher divalent groups, each based on the total moles of groups. As described above, the $C_{16}$ or higher divalent groups (b) can be (b1) phthalimidine divalent groups, (b2) third divalent groups or (b3) a combination of the phthalimidine groups and the third divalent groups, each based on the sum of moles of the bisphenol A divalent groups, and the $C_{16}$ or higher divalent groups.

The ester units of the poly(ester-carbonate) copolymer are present in an amount of 40 mol % to 60 mol % based on the sum of the moles of the carbonate units and the ester units.

The poly(ester-carbonate)s can have a weight average molecular weight of 10,000 to 50,000 Daltons, preferably 18,000 to 25,000 Daltons, as measured by gel permeation chromatography (GPC), using a crosslinked styrene-divinylbenzene column and calibrated to bisphenol A homopolycarbonate reference standards. GPC samples are prepared at a concentration of 1 mg per ml, and are eluted at a flow rate of 1.5 ml per minute.

The poly(ester-carbonate)s can have high heat resistance. The heat deflection temperature (HDT) of the poly(ester-carbonate)s can be 180 to 215° C., preferably 200 to 210° C., measured flat on a 80×10×4 mm bar with a 64 mm span at 0.45 MPa according to ISO 75/Bf.

The poly(ester-carbonate)s can have high Vicat softening temperature. In an embodiment, the poly(ester-carbonate)s have a Vicat B120 of 195 to 235° C., preferably 200 to 230° C., measured according to ISO 306.

The laser weldable compositions can further optionally comprise other amorphous polycarbonates, such as linear or branched polycarbonate homo-polymers and copolymers for example.

The laser weldable compositions further comprise a filler in an amount from 5 to 50, preferably 10 to 40 wt. % of the total weight of the composition. Such fillers include fibrous reinforcing materials, for example, inorganic fibers (e.g., glass, silica, alumina, silica-alumina, aluminum silicate, zirconia, silicon carbide, or the like), inorganic whiskers (e.g., silicon carbide, alumina, or the like), organic fibers (e.g., aliphatic or aromatic polyamide, aromatic polyester, fluorine-containing resins, acrylic resin such as a polyacrylonitrile, rayon or the like), plate-like reinforcing materials (e.g., talc, mica, glass, and the like), particulate reinforcing materials (e.g., glass beads, glass powder, milled fiber (e.g., a milled glass fiber), or, which can be in the form of a plate, column, or fiber. The average diameter of the fibrous reinforcing material (as introduced into a composition) can be, for example, 1 to 50 micrometers, specifically 3 to 30 μm micrometers, more specifically 8 to 15 micrometers and the average length of the fibrous reinforcing material can be, for example, 100 micrometers to 15 mm, specifically 1 mm to 10 mm, and more specifically 2 mm to 5 mm. Moreover, the average particle size of the plate-like or particulate reinforcing material may be, for example, 0.1 to 100 μm and specifically 0.1 to 50 micrometers (e.g., 0.1 to 10 micrometers).

In a specific embodiment, the reinforcing filler is a glass or glassy filler, specifically a glass fiber, a glass flake, and a glass bead, talc, or mica. In particular, the reinforcing filler is glass fibers, particularly, a chopped strand product. In an embodiment, the glass fiber has an average diameter of 3 to 30 micrometers or 8 to 15 micrometers. The glass fiber also has an average length of 0.1 to 15 millimeters or 2 to 12 millimeters. The glass fiber can be coated with a silane, epoxy silane, or other surface-treating agent (solid loss on Ignition of 0.1-2.5%).

In the final composition, because of breakage of the glass fibers during mixing and melt blending, the average length for chopped glass fibers can be about 0.1 to 10 mm, specifically, 2 to 5 mm.

The laser weldable compositions can include various other additives ordinarily incorporated with compositions of this type, with the proviso that the additives are selected so as not to significantly adversely affect the desired properties of the composition. Combinations of additives can be used. Exemplary additives include an antioxidant, thermal stabilizer, light stabilizer, ultraviolet light absorbing additive, quencher, plasticizer, mold release agent, antistatic agent, radiation stabilizer, mold release agent, or a combination thereof. Each of the foregoing additives, when present, is used in amounts typical for composition compositions, for example, 0.01 to 15 wt. % of the total weight of the laser weldable compositions, preferably 0.1 to 10 wt. % of the total weight of the weldable compositions. In an embodiment, the compositions comprise from 0.01 to 5 wt. % of a combination of an antioxidant, mold release agent, colorant, or stabilizer, based on the total weight of the composition.

Exemplary antioxidant additives include, for example, organophosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecyl-thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 wt. %, based on the total weight of the composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 wt. %, based on the total weight of the composition.

Mold release agents include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate, the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; combinations of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 wt. %, specifically 0.01 to 0.75 wt. %, and more specifically 0.1 to 0.5 wt. %, based on the total weight of the composition.

Optionally, the laser weldable compositions further include a colorant, specifically either one or more colorants that do not absorb substantially in the NIR (800 to 1500 nm) and from which a colored laser transmitting article can be molded. The laser weldable compositions can be used for the laser-absorbing part except that one or more laser absorbing colorants, for example, carbon black, organic compounds such as perylenes, or nanoscaled inorganic compounds such as metal oxides, mixed metal oxides or metal-borides are added.

The laser weldable compositions can be manufactured by various methods known in the art. For example, polycarbonate, polyester component, filler, and other optional components are first blended, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The laser weldable compositions, when molded into an article having a 2.0 mm thickness, can provide a near infrared transmission at 960 nanometers of greater than 50% and the thermal resistance according to HDT 1.8 MPa flat (ISO 75/Af) is greater than 160° C., preferably greater than 165° C. and more preferably greater than 170° C.

Shaped, formed, or molded articles comprising the compositions are also provided. In one embodiment, an article is formed by extruding, casting, blow molding, or injection molding a melt of the composition. The article can be in the form of a film or sheet.

In another aspect of the disclosure, parts can be assembled into an article by laser welding. A process for welding a first part comprising the above laser weldable compositions to a second part comprises physically contacting at least a portion of a surface of the first part with at least a portion of a surface of the second part, applying NIR laser radiation to and through the first part, which provides improved transmission, wherein after the radiation passes through the first part, the radiation is absorbed by the composition of the second part and sufficient heat is generated to weld the first part to the second part, resulting in a welded article.

The second composition part of the article can comprise a wide variety of composition polymer compositions that have been rendered laser absorbing by means known to those of skill in the art including the use of additives or colorants such as but not limited to carbon black. Exemplary polymer compositions can include but are not limited to, olefinic polymers, including polyethylene and its copolymers and terpolymers, polybutylene and its copolymers and terpolymers, polypropylene and its copolymers and terpolymers; alpha-olefin polymers, including linear or substantially linear interpolymers of ethylene and at least one alpha-olefin and atactic poly(alpha-olefins); rubbery block copolymers; polyamides; polyimides; polyesters such as poly(arylates), poly(ethylene terephthalate) and poly(butylene terephthalate); vinylic polymers such as polyvinyl chloride and polyvinyl esters such as polyvinyl acetate; acrylic homopolymers, copolymers and terpolymers; epoxies; polycarbonates, polyester-polycarbonates; polystyrene; poly(arylene ethers), including poly(phenylene ether); polyurethanes; phenoxy resins; polysulfones; polyethers; acetal resins; polyoxyethylenes; and combinations thereof. More particularly, the polymers are polyethylene, ethylene copolymers, polypropylene, propylene copolymers, polyesters, polycarbonates, polyester-polycarbonates, polyamides, poly(arylene ether)s, or a combination comprising at least one of the foregoing. In a specific embodiment, the second article comprises an olefinic polymer, polyamide, polyimide, polystyrene, polyarylene ether, polyurethane, phenoxy resin, polysulfone, polyether, acetal resin, polyester, vinylic polymer, acrylic, epoxy, polycarbonate, poly(ester-carbonate), styrene-acrylonitrile copolymers, or a combination comprising at least one of the foregoing. More specifically, the second article comprises a polycarbonate homopolymer or copolymer, polyester homopolymer or copolymer, e.g., a poly(carbonate-ester) or a combination comprising at least one of the foregoing.

In an embodiment the second part of the article comprises a glass-filled crystalline or partially crystalline composition that has been rendered laser absorbing. Compositions and methods for rendering such composition laser absorbing are known to those of skill in the art. In another embodiment, the second part comprises a glass-filled combination of a partially crystalline composition and an amorphous thermoplastic poly(ester) copolymer, poly(ester-carbonate), or combination thereof that has been rendered laser absorbing.

The thermoplastic composition of the laser-absorbing second part of the article can further comprise an effective amount of a near-infrared absorbing material (a material absorbing radiation wavelengths from 800 to 1400 nanometers) that is also not highly absorbing to visible light (radiation wavelengths from 350 nanometers to 800 nanometers). In particular the near-infrared absorbing material can comprise carbon black, organic dyes including polycyclic organic compounds such as perylenes, nanoscaled compounds, metal complexes including metal oxides, mixed metal oxides, complex oxides, metal-sulphides, metal-borides, metal-phosphates, metal-carbonates, metal-sulphates, metal-nitrides, lanthanum hexaboride, cesium tungsten oxide, indium tin oxide, antimony tin oxide, indium zinc oxide, and combinations thereof. In an embodiment, the near-infrared material has an average particle size of 1 to 200 nanometers. Depending on the particular NIR absorbing material used, the NIR absorbing material can be present in the thermoplastic composition of the second article in an amount from 0.00001 to 5 wt. % of the composition. Effective amounts for NIR absorption in welding are readily determined by one of ordinary skill in the art without undue experimentation. Lanthanum hexaboride and cesium tungsten oxide, for example, can be present in the composition in an amount from 0.00001 to 1 wt. %, still more specifically 0.00005 to 0.1 wt. %, and most specifically 0.0001 to 0.01 wt. %, based on total weight of the laser-weldable composition for the absorbing part of the article to be welded.

Also disclosed are laser-welded articles comprising the laser weldable compositions as described herein in a first component, laser-welded to a second component comprising a second thermoplastic composition as described herein. In a particularly advantageous feature, the discovery allows the use of laser welding in the manufacture of sensor housings for use in engines.

The laser weldable compositions are further illustrated by the following non-limiting examples.

EXAMPLES

The materials used in the Examples are shown in Table 1 below.

TABLE 1

| COMPONENT | CHEMICAL DESCRIPTION | SOURCE |
|---|---|---|
| Ester 1 | Poly(1,4-butylene terephthalate), ($M_w$ = 66,000 g/mol, using polystyrene standards) | SABIC |
| Ester 2 | Poly(1,4-butylene terephthalate), ($M_w$ = 115,000 g/mol, using polystyrene standards) | SABIC |
| PC 1 | Bisphenol A polycarbonate homopolymer ($M_w$ = 22,000 g/mol), prepared by interfacial process, amorphous. | SABIC |
| PC 2 | Amorphous poly(ester-carbonate), bisphenol A based poly(phthalate-carbonate) containing 80% isophthalate-terephthalate ester units (Mw = 28,500 g/mol, using polystyrene standards) | SABIC |
| PC 3 | PPPBP/BPA copolycarbonate (32 mol % PPPBP, 25K Mw) | SABIC |
| PC 4 | Amorphous PPP/BPA poly(ester-carbonate), (46 mol % PPPBP, 52% isophthalate-terephthalate ester, 23K Mw, Tg 226° C.) | SABIC |
| AO1010 | Pentaerythritol tetrakis(3,5-di-tert-butyl-4-hydroxyhydrocinnamate) (IRGANOX 1010) | Ciba Specialty Chemicals |
| Glass fiber | $SiO_2$ - fibrous glass (10 mm length, 13 micrometer diameter) (T120) | Nippon Electric Glass |
| MZP | Monozinc phosphate-2-hydrate | Chemische Fabriek |
| PETS | Pentaerythritol tetrastearate | Lonza, Inc. |

*Polycarbonate weight average molecular weights (Mw) are based on GPC measurements using a polystyrene standard and calibrated and expressed in polycarbonate units based on bisphenol A polycarbonate standards.

The samples containing PBT were prepared by melt extrusion on a Werner & Pfleiderer 25 mm twin screw extruder, using a nominal melt temperature of 250 to 270° C. and 300 rpm. The extrudate was pelletized and dried at 120° C. for 3 hours. Test specimens were produced from the dried pellets and were injection molded at nominal temperatures of 250 to 280° C.

The near infrared (NIR) transmission data was measured on 1.6 mm and 2 mm thick molded parts and collected on a Perkin-Elmer Lambda 950 spectrophotometer at 960 nm. Vicat softening and heat deflection temperatures were determined on molded samples in accordance with the methods shown in Table 2.

TABLE 2

| Test | Description |
|---|---|
| Vicat Softening Temperature | Vicat Softening temperature was measured according to ISO 306 at 120° C./hr and 50N load. |
| Heat Deflection Temperature (HDT) | HDT was measured at 0.45 MPa and 1.8 MPa on the flat side of a 4-mm thick bar according to ISO 75Af. |

Comparative Examples 1-5 and Example 1

Comparative Examples 1-5 and example 1 demonstrate the effect of the addition of various polycarbonate polymers to PBT on NIR transmission, heat defection, and Vicat softening properties. Formulations and results are shown in Table 3.

TABLE 3

| Description | | CEx. #1 | CEx. #2 | CEx. #3 | CEx. #4 | CEx. #5 | Ex. #1 |
|---|---|---|---|---|---|---|---|
| Ester 1 | % | 39.69 | 49.69 | 34.69 | 50.69 | 50.69 | 50.69 |
| Ester 2 | % | 30.00 | | | | | |
| PC 1 | % | | 20.00 | 35.00 | | | |
| PC 2 | % | | | | 19.00 | | |
| PC 3 | % | | | | | 19.00 | |
| PC 4 | % | | | | | | 19.00 |
| Glass fiber | % | 30 | 30 | 30 | 30 | 30 | 30 |
| PETS | % | 0.20 | 0.20 | 0.20 | 0.20 | 0.20 | 0.20 |
| AO1010 | % | 0.06 | 0.06 | 0.06 | 0.06 | 0.06 | 0.06 |
| MZP | % | 0.05 | 0.05 | 0.05 | 0.05 | 0.05 | 0.05 |
| SUM | % | 100.0 | 100.0 | 100.0 | 100.0 | 100.0 | 100.0 |
| VICAT B120 | °C. | 217 | 185 | 155 | 186 | 197 | 200 |
| HDT 0.45 MPa/Flat | °C. | 215 | 138 | 125 | 204 | 213 | 214 |
| HDT 1.8 MPa/Flat | °C. | 199 | 171 | 153 | 143 | 178 | 174 |
| NIR % T at 960 nm (1.6 mm) | % | 25 | 41 | 71 | 79 | 36 | 66 |
| NIR % T at 960 nm (2.0 mm) | % | 22 | 26 | 41 | 70 | 28 | 58 |

Comparative example #1 shows the limitations of glass filled polyester compositions with respect to near infrared transparency. A 1.6 mm thickness sample only has a NIR transparency of 25% and a 2.0 mm thickness sample only has a NIR transparency of 22%, which severely restrict the use of these compositions to produce "laser transparent" parts for laser welding assembly.

The addition of amorphous polycarbonate PC1 increases the NIR transmission but dramatically lowers the thermal resistance. Comparative example #2 shows that the addition of 20 wt. % of PC1 increases the NIR transparency from 25% to 41% but lowers the HDT at 0.45 MPa from 215° C. to 138° C. Similarly, comparative example #3 shows that the addition of 30 wt. % of PC1 increases the NIR transparency from 22% to 71% but decrease the HDT at 0.45 MPa from 215° C. to 125° C.

Using a high heat polycarbonate based on a PPPBP-BPA copolymer or a high heat bisphenol A based poly(phthalate-carbonate) (PPC) does not furnish the desired high thermal resistance and high NIR transmission at the same time either. (Comparatives examples 4 and 5)

The addition of a high heat PPPBP-polyester-carbonate as described herein provides the best balance of high thermal resistance and high NIR transmission.

Set forth below are various embodiments of the disclosure.

Embodiment 1

A laser weldable composition comprising a polyester component comprising a poly(butylene terephthalate) homopolymer, a poly(ethylene terephthalate) homopolymer, a poly(cyclohexylenedimethylene terephthalate) homopolymer, a poly(butylene terephthalate) copolymer, a poly(ethylene terephthalate) copolymer, a poly(cyclohexylenedimethylene terephthalate) copolymer, or a combination comprising at least one of the foregoing; 5 to 50 weight percent of a filler; and 10 to 30 wt. %, preferably 15 to 25% of a poly(ester-carbonate) copolymer comprising carbonate units of the formula

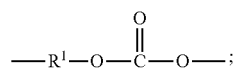

and ester units of the formula

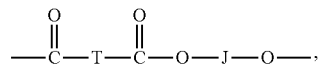

wherein: T is a $C_{2-20}$ alkylene, a $C_{6-20}$ cycloalkylene, or a $C_{6-20}$ arylene; $R^1$ and J are each independently (a) a bisphenol A divalent group of the formula

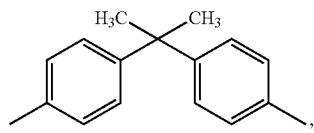

and
(b) a $C_{16}$ or higher divalent group (b1), (b2), or (b1) and (b2), wherein (b1) is a phthalimidine divalent group of the formula

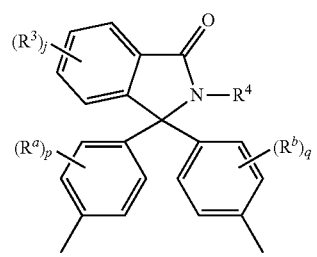

wherein $R^a$ and $R^b$ are each independently a $C_{1-12}$ alkyl, $C_{2-12}$ alkenyl, $C_{3-8}$ cycloalkyl, or $C_{1-12}$ alkoxy, each $R^3$ is independently a $C_{1-6}$ alkyl, $R^4$ is hydrogen, $C_{1-6}$ alkyl, or phenyl optionally substituted with 1 to 5 $C_{1-6}$ alkyl groups, preferably wherein $R^4$ is hydrogen, methyl, or phenyl, preferably phenyl, p, q, and j are each independently 0 to 4, preferably 0, and (b2) is a third divalent group of the formula

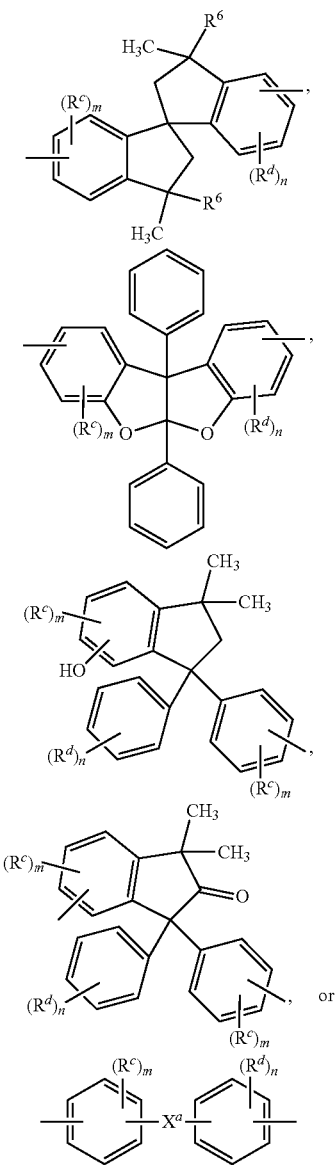

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-12}$ alkyl or phenyl, $X^a$ is a $C_{6-12}$ polycyclic aryl, $C_{3-18}$ mono- or polycycloalkylene, $C_{3-18}$ mono- or polycycloalkylidene, $-(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, and m and n are each independently 0 to 4; wherein the $C_{16}$ or higher divalent group (b1), (b2) or a combination of (b1) and (b2) is present in an amount of 40 mol % to 50 mol % based on the total moles of the bisphenol A divalent groups and the $C_{16}$ or higher divalent group; and the composition, when molded into an article having a 2.0 mm thickness, provides a near infrared transmission at 960 nanometers of greater than 50% and a thermal resistance according to HDT 1.8 MPa flat (ISO 75/Af) of greater than 160° C., preferably greater than 165° C. and more preferably greater than 170° C.

Embodiment 2

The composition of Embodiment 1, wherein the $C_{16}$ or higher divalent group (b) is the phthalimidine divalent group (b1).

Embodiment 3

The composition of Embodiment 2, wherein $R^1$ and J are each independently the bisphenol A divalent group, or the phthalimidine divalent group, and at least a portion of the J groups are the phthalimidine divalent group.

Embodiment 4

The composition of Embodiment 1, wherein the $C_{16}$ or higher divalent group (b) is the third divalent group (b2).

Embodiment 5

The composition of Embodiment 4, wherein $R^1$ and J are each independently the bisphenol A divalent group or the third divalent group; and at least a portion of the J groups are the third divalent group.

Embodiment 6

The composition of Embodiment 1, wherein the $C_{16}$ or higher divalent group (b) is a combination of the phthalimidine divalent group (b1) and third divalent group (b2).

Embodiment 7

The composition of Embodiment 6, wherein $R^1$ and J are each independently the bisphenol A divalent group, the phthalimidine divalent group, and the third divalent group; and at least a portion of the J groups are the phthalimidine divalent group and the third divalent group.

Embodiment 8

The composition of any one or more of Embodiments 1 or 4 to 6, wherein the third divalent group is of the formula (6)

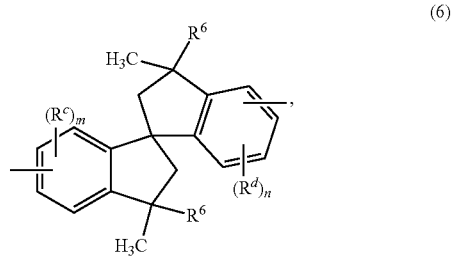

-continued (7)
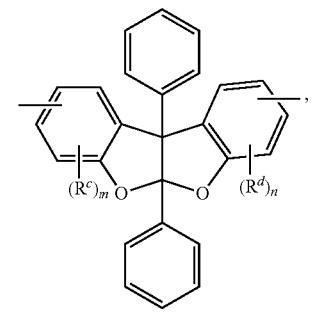

(16)
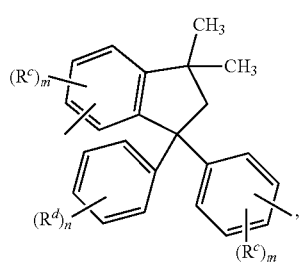

(17)
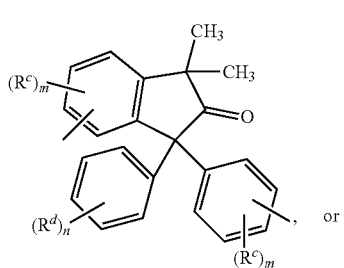

, or (8)
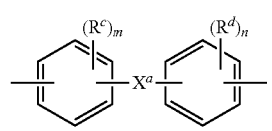

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, or a $-(Q^1)_x-G-(Q^2)_y-$ group, wherein $Q^1$ and $Q^2$ are each independently a $C_{1-3}$ alkylene, G is a $C_{3-10}$ cycloalkylene, x is 0 or 1, y is 1, and m and n are each independently 0 to 4.

Embodiment 9

The composition of Embodiment 8, wherein the third divalent group is of the formula

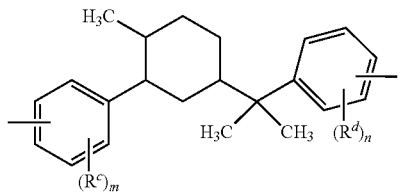

-continued

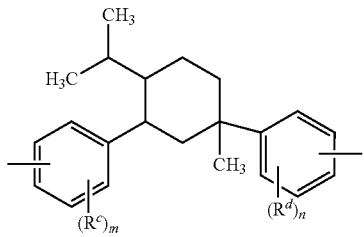

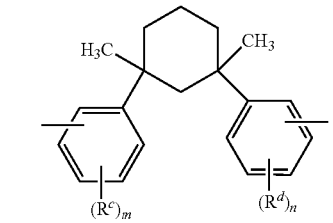

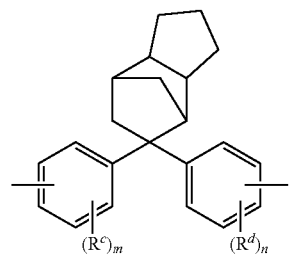

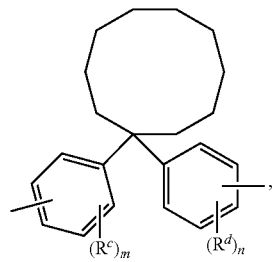

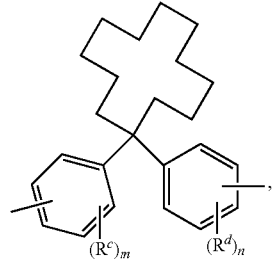

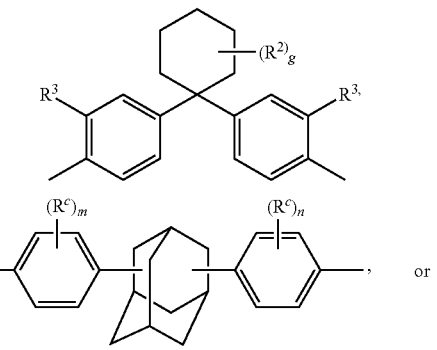

, or

-continued

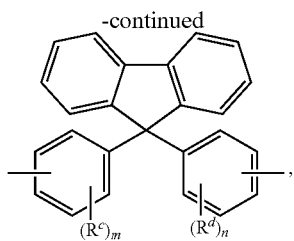

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^2$ is independently hydrogen or $C_{1-4}$ alkyl, m and n are each independently 0 to 4, each $R^3$ is independently $C_{1-4}$ alkyl or hydrogen, and g is 0 to 10.

Embodiment 10

The composition of any one of Embodiments 1 to 9, wherein T is a $C_{6-20}$ divalent aromatic group, preferably isophthaloyl group, a divalent terephthaloyl group, or a combination thereof.

Embodiment 11

The composition of any one of Embodiments 1 to 10, wherein the molar ratio of the carbonate units relative to the ester units is 2:1 to 1:2.

Embodiment 12

The composition of any one or more of Embodiments 1 to 11, wherein: the filler comprises a glass filler and is present in an amount of 10 wt. % to 30 wt. % based on the total weight of the composition; the polyester component is a poly(butylene terephthalate) homopolymer; and in the poly(ester-carbonate) copolymer, $R^1$ and J are each independently a bisphenol A divalent group and a phthalimidine divalent group wherein p, q, and j are zero, and $R^4$ is phenyl, and both the bisphenol A divalent group and the phthalimidine divalent group are present in the poly(ester-carbonate) copolymer, and the poly(ester-carbonate) copolymer is present in an amount of 15 wt. % to 25 wt. %, preferably 15 wt. % to 20 wt. %, based on the total weight of the composition.

Embodiment 13

The composition of any of Embodiments 1 to 12 wherein the filler is glass fiber, preferably wherein the glass fiber has an average diameter of 3 to 30 micrometers and an average length of 0.1 to 15 mm.

Embodiment 14

A process for welding a laser-transmissive first part to a laser-absorbing second part of an article, the process comprising
contacting a first part comprising the composition of any one of Embodiments 1 to 13 with a second part comprising a thermoplastic composition comprising an NIR-absorbing agent, where at least a portion of a surface of the first part is placed in physical contact with at least a portion of a surface of the second part to form a welding join area, and applying NIR-laser radiation to the first part such that the radiation substantially passes through the first part and is absorbed by the second part so that sufficient heat is generated to effectively weld the first part to the second part of the article.

Embodiment 15

The process of Embodiment 14, wherein the second part comprises a polymer comprising a polycarbonate, a polyester, or a combination comprising at least one of the foregoing; and the NIR absorbing material comprises carbon black, organic dyes, metal oxides, complex oxides, metal-sulphides, metal-borides, metal-phosphates, metal-carbonates, metal-sulphates, metal-nitrides, lanthanum hexaboride, cesium tungsten oxide, indium tin oxide, antimony tin oxide, indium zinc oxide, or a combination comprising at least one of the foregoing.

Embodiment 16

The process of any one of Embodiments 14 or 15, wherein the NIR absorbing material is present in the thermoplastic composition of the second part in an amount from 0.00001 to 5 wt. %, based on total weight of the thermoplastic composition of the second part.

Embodiment 17

A laser welded, molded article comprising a first laser-transmissive part welded to a second laser-absorbing part, wherein the first part comprises a product made by a process comprising melting-blending a composition of any one of Embodiments 1 to 13.

Embodiment 18

The article of Embodiment 17, wherein the second part comprises a polymer comprising a polycarbonate, a polyester, polycarbonate copolymers, polyester copolymers, and combinations thereof.

Embodiment 19

The article of Embodiment 18, wherein the second part further comprises a NIR absorbing material comprising carbon black, organic dyes, metal oxides, complex oxides, metal-sulphides, metal-borides, metal-phosphates, metal-carbonates, metal-sulphates, metal-nitrides, lanthanum hexaboride, cesium tungsten oxide, indium tin oxide, antimony tin oxide, indium zinc oxide, or a combination comprising at least one of the foregoing.

Embodiment 20

The article of any one of Embodiments 17 to 19, wherein the NIR absorbing material is present in the thermoplastic composition of the second part in an amount from 0.00001 to 5 wt. %, based on total weight of the second part.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms; "cycloalkylene" refers to a divalent group formed by the removal of two hydrogen atoms from two different carbon atoms on one or more rings of a cycloalkyl group; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a substituted position include nitro (—NO$_2$), cyano (—CN), hydroxy (—OH), halogen, thiol (—SH), thiocyano (—SCN), C$_{2-6}$ alkanoyl (e.g., acyl (H$_3$CC(=O)—); carboxamido; C$_{1-6}$ or C$_{1-3}$ alkyl, cycloalkyl, alkenyl, and alkynyl (including groups having at least one unsaturated linkages and from 2 to 8, or 2 to 6 carbon atoms); C$_{1-6}$ or C$_{1-3}$ alkoxy; C$_{6-10}$ aryloxy such as phenoxy; C$_{1-6}$ alkylthio; C$_{1-6}$ or C$_{1-3}$ alkylsulfinyl; C$_{1-6}$ or C$_{1-3}$ alkylsulfonyl; aminodi(C$_{1-6}$ or C$_{1-3}$)alkyl; C$_{6-12}$ aryl having at least one aromatic rings (e.g., phenyl, biphenyl, naphthyl, or the like, each ring either substituted or unsubstituted aromatic); C$_{7-19}$ arylalkyl having 1 to 3 separate or fused rings and from 6 to 18 ring carbon atoms; or arylalkoxy having 1 1 to 3 separate or fused rings and from 6 to 18 ring carbon atoms.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A laser weldable composition comprising
a polyester component comprising a poly(butylene terephthalate) homopolymer, a poly(ethylene terephthalate) homopolymer, a poly(cyclohexylenedimethylene terephthalate) homopolymer, a poly(butylene terephthalate) copolymer, a poly(ethylene terephthalate) copolymer, a poly(cyclohexylenedimethylene terephthalate) copolymer, or a combination comprising at least one of the foregoing;
5 to 50 weight percent of a filler; and
10 to 30 wt. % of a poly(ester-carbonate) copolymer comprising
carbonate units of the formula

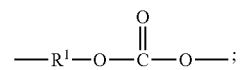

and
ester units of the formula

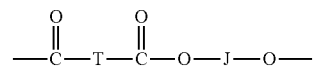

wherein:
T is a C$_{2-20}$ alkylene, a C$_{6-20}$ cycloalkylene, or a C$_{6-20}$ arylene;
R$^1$ and J are each independently
(a) a bisphenol A divalent group of the formula

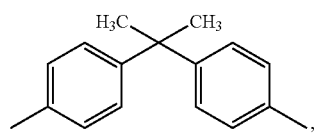

and
(b) a C$_{16}$ or higher divalent group (b1), (b2), or (b1) and (b2), wherein
(b1) is a phthalimidine divalent group of the formula

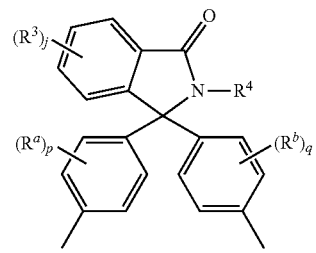

wherein
R$^a$ and R$^b$ are each independently a C$_{1-12}$ alkyl, C$_{2-12}$ alkenyl, C$_{3-8}$ cycloalkyl, or C$_{1-12}$ alkoxy, each $R^3$ is independently a $C_{1-6}$ alkyl,
$R^4$ is hydrogen, $C_{1-6}$ alkyl, or phenyl optionally substituted with 1 to 5 $C_{1-6}$ alkyl groups,
p, q, and j are each independently 0 to 4, and
(b2) is a third divalent group of the formula

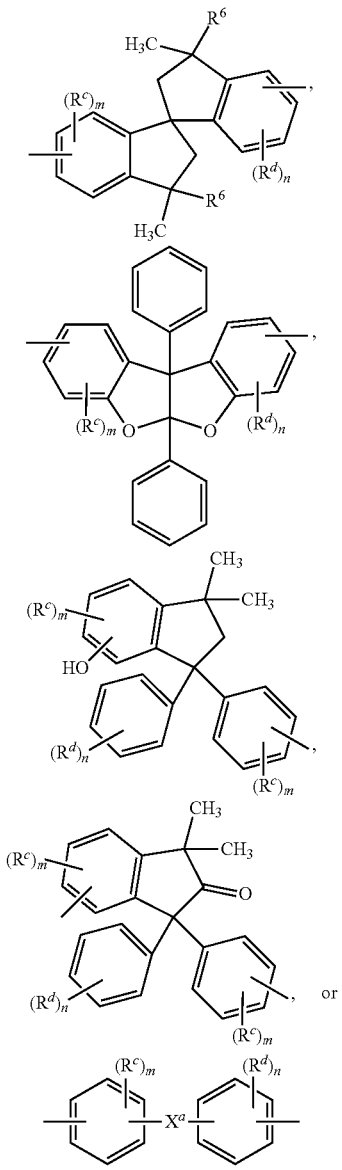

wherein
$R^c$ and $R^d$ are each independently a $C_{1-12}$ alkyl, $C_{2-12}$ alkenyl, $C_{3-8}$ cycloalkyl, or $C_{1-12}$ alkoxy,
each $R^6$ is independently $C_{1-3}$ alkyl or phenyl,
$X^a$ is a $C_{6-12}$ polycyclic aryl, $C_{3-18}$ mono- or polycycloalkylene, $C_{3-18}$ mono- or polycycloalkylidene, $(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, and
m and n are each independently 0 to 4;
wherein
the $C_{16}$ divalent group (b1), (b2) or a combination of (b1) and (b2) is present in an amount of 40 mol % to 50 mol % based on the total moles of the bisphenol A divalent groups and the $C_{16}$ divalent group; and
the composition, when molded into an article having a 2.0 mm thickness, provides a near infrared transmission at 960 nanometers of greater than 50% and a thermal resistance according to HDT 1.8 MPa flat (ISO 75/Af) of greater than 160° C.

2. The composition of claim 1, wherein the $C_{16}$ divalent group (b) is the phthalimidine divalent group (b1).

3. The composition of claim 2, wherein $R^1$ and J are each independently the bisphenol A divalent group, or the phthalimidine divalent group, and at least a portion of the J groups are the phthalimidine divalent group.

4. The composition of claim 1, wherein the $C_{16}$ or higher divalent group (b) is the third divalent group (b2).

5. The composition of claim 4, wherein $R^1$ and J are each independently the bisphenol A divalent group or the third divalent group; and at least a portion of the J groups are the third divalent group.

6. The composition of claim 1, wherein the C16 divalent group (b) is a combination of the phthalimidine divalent group (b1) and third divalent group (b2).

7. The composition of claim 6, wherein $R^1$ and J are each independently the bisphenol A divalent group, the phthalimidine divalent group, and the third divalent group; and at least a portion of the J groups are the phthalimidine divalent group and the third divalent group.

8. The composition of claim 1, wherein the third divalent group has a formula (6)

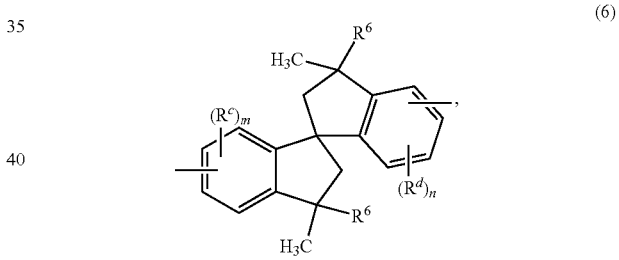

(7)

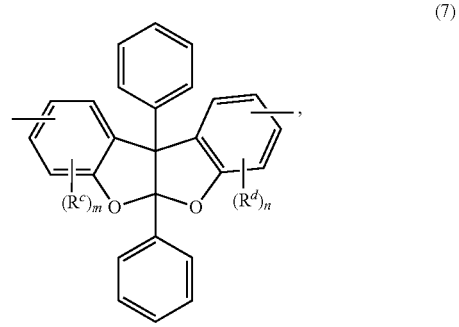

(16)

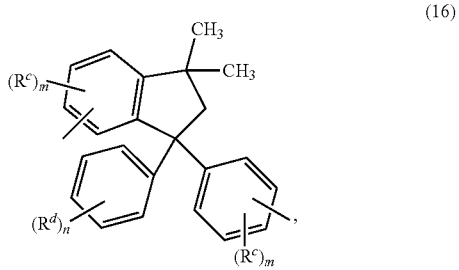

-continued

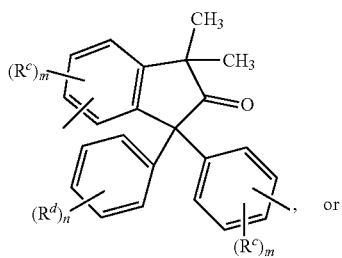

(17)

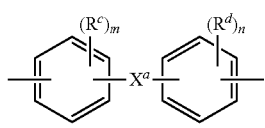

(8)

wherein
R$^c$ and R$^d$ are each independently a C$_{1-12}$ alkyl, C$_{2-12}$ alkenyl, C$_{3-8}$ cycloalkyl, or C$_{1-12}$ alkoxy,
each R$^6$ is independently C$_{1-3}$ alkyl or phenyl,
X$^a$ is a C$_{6-12}$ polycyclic aryl, C$_{3-18}$ mono- or polycycloalkylene, C$_{3-18}$ mono- or polycycloalkylidene, or a (Q$^1$)$_x$-G-(Q$^2$)$_y$- group, wherein Q$^1$ and Q$^2$ are each independently a C$_{1-3}$ alkylene, G is a C$_{3-10}$ cycloalkylene,
x is 0 or 1,
y is 1, and
m and n are each independently 0 to 4.

9. The composition of claim 8, wherein the third divalent group has a formula

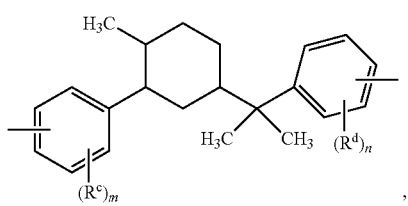

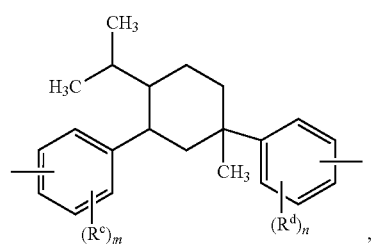

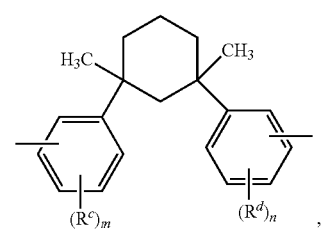

-continued

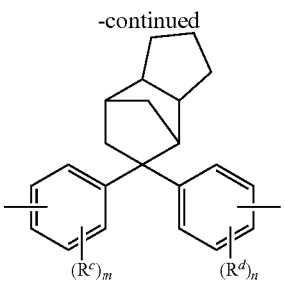

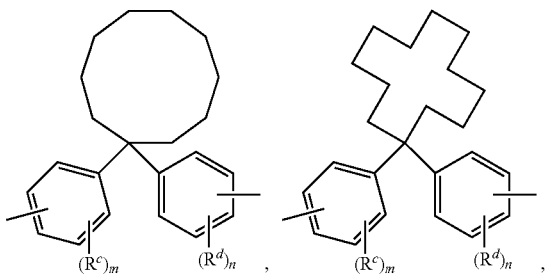

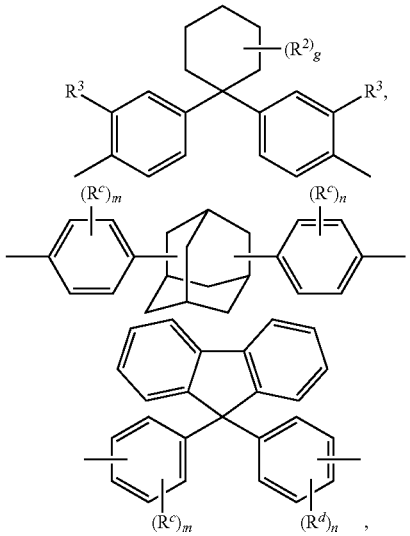

, or

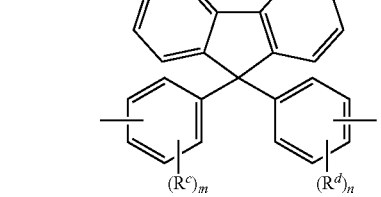

wherein
R$^c$ and R$^d$ are each independently a C$_{1-12}$ alkyl, C$_{2-12}$ alkenyl, C$_{3-8}$ cycloalkyl, or C$_{1-12}$ alkoxy,
each R$^2$ is independently hydrogen or C$_{1-4}$ alkyl,
m and n are each independently 0 to 4,
each R$^3$ is independently C$_{1-4}$ alkyl or hydrogen, and
g is 0 to 10.

10. The composition of claim 1, wherein T is a C$_{6-20}$ divalent aromatic group.

11. The composition of claim 1, wherein the molar ratio of the carbonate units relative to the ester units is 2:1 to 1:2.

12. The composition of claim 1, wherein:
the filler comprises a glass filler and is present in an amount of 10 wt. % to 30 wt. % based on the total weight of the composition;
the polyester component is a poly(butylene terephthalate) homopolymer; and
in the poly(ester-carbonate) copolymer, R$^1$ and J are each independently a bisphenol A divalent group and a phthalimidine divalent group wherein p, q, and j are zero, and R$^4$ is phenyl, and both the bisphenol A divalent group and the phthalimidine divalent group are present in the poly(ester-carbonate) copolymer, and the poly(ester-carbonate) copolymer is present in an amount of 15 wt. % to 25 wt. % based on the total weight of the composition.

13. The composition of claim 1 wherein the filler is glass fiber.

14. A process for welding a laser-transmissive first part to a laser-absorbing second part of an article, the process comprising contacting a first part comprising the composition of claim 1 with a second part comprising a thermoplastic composition comprising an NIR-absorbing agent, where at least a portion of a surface of the first part is placed in physical contact with at least a portion of a surface of the second part to form a welding join area, and applying NIR-laser radiation to the first part such that the radiation substantially passes through the first part and is absorbed by the second part so that sufficient heat is generated to effectively weld the first part to the second part of the article.

15. The process of claim 14, wherein the second part comprises a polymer comprising a polycarbonate, a polyester, or a combination comprising at least one of the foregoing; and the NIR absorbing material comprises carbon black, organic dyes, metal oxides, complex oxides, metal-sulphides, metal-borides, metal-phosphates, metal-carbonates, metal-sulphates, metal-nitrides, lanthanum hexaboride, cesium tungsten oxide, indium tin oxide, antimony tin oxide, indium zinc oxide, or a combination comprising at least one of the foregoing.

16. The process of claim 14, wherein the NIR absorbing material is present in the thermoplastic composition of the second part in an amount from 0.00001 to 5 wt. %, based on total weight of the thermoplastic composition of the second part.

17. A laser welded, molded article comprising a first laser-transmissive part welded to a second laser-absorbing part, wherein the first part comprises a product made by a process comprising melting-blending a composition of claim 1.

18. The article of claim 17, wherein the second part comprises a polymer comprising a polycarbonate, a polyester, polycarbonate copolymers, polyester copolymers, and combinations thereof.

19. The article of claim 18, wherein the second part further comprises a NIR absorbing material comprising carbon black, organic dyes, metal oxides, complex oxides, metal-sulphides, metal-borides, metal-phosphates, metal-carbonates, metal-sulphates, metal-nitrides, lanthanum hexaboride, cesium tungsten oxide, indium tin oxide, antimony tin oxide, indium zinc oxide, or a combination comprising at least one of the foregoing.

20. The article of claim 19, wherein the NIR absorbing material is present in the thermoplastic composition of the second part in an amount from 0.00001 to 5 wt. %, based on total weight of the second part.

* * * * *